(12) United States Patent
Yamamoto (10) Patent No.: US 9,722,478 B2
(45) Date of Patent: Aug. 1, 2017

(54) STEPPING MOTOR (71) Applicant: NIDEC SANKYO CORPORATION, Nagano (JP)

(72) Inventor: Toshio Yamamoto, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 577 days.

(21) Appl. No.: 14/231,024

(22) Filed: Mar. 31, 2014

(65) Prior Publication Data
US 2014/0300219 A1 Oct. 9, 2014

(30) Foreign Application Priority Data

Apr. 5, 2013 (JP) ................. 2013-079890

(51) Int. Cl.
*H02K 7/08* (2006.01)
*H02K 37/24* (2006.01)
*H02K 5/04* (2006.01)
*H02K 5/167* (2006.01)
*H02K 37/12* (2006.01)
*H02K 7/102* (2006.01)

(52) U.S. Cl.
CPC .............. *H02K 37/24* (2013.01); *H02K 5/04* (2013.01); *H02K 5/1672* (2013.01); *H02K 7/1021* (2013.01); *H02K 37/12* (2013.01)

(58) Field of Classification Search
CPC .......... H02K 7/08; H02K 7/083; H02K 37/14; H02K 5/04; H02K 21/145; H02K 5/1672
See application file for complete search history.

(56) References Cited

U.S. PATENT DOCUMENTS

| 4,438,361 A * | 3/1984 | Manson | ............... H02K 5/1732 310/49.16 |
| 5,856,718 A * | 1/1999 | Matsushita | ............ H02K 37/22 310/49.55 |
| 2011/0089781 A1* | 4/2011 | Yoneyama | ........... H02K 1/2733 310/156.12 |

FOREIGN PATENT DOCUMENTS

| JP | 2007202240 A | 8/2007 |
| JP | 2009290925 A | 12/2009 |

* cited by examiner

*Primary Examiner* — Hanh Nguyen
*Assistant Examiner* — Leda Pham
(74) *Attorney, Agent, or Firm* — Cantor Colburn LLP (57) ABSTRACT

A stepping motor may include a rotor having a rotation shaft and a permanent magnet, a fixed body having a cylindrical stator provided with a plurality of pole teeth so as to face the permanent magnet, an urging member which urges the rotor toward one side in a motor axial line direction, a supported face of the rotor which faces the one side in the motor axial line direction, and a support face of the fixed body which slidably supports the supported face of the rotor on the one side with respect to the supported face. When a first sliding load which is a total sliding load applied to the rotor is "Ta", a detent torque acted on the rotor is "Td", and a dynamic torque acted on the rotor by the stator is "Te", then "Ta", "Td" and "Te" satisfy the following expression:

"Td"<"Ta"<"Te".

22 Claims, 5 Drawing Sheets

STEPPING MOTOR

CROSS REFERENCE TO RELATED APPLICATION

The present invention claims priority under 35 U.S.C. §119 to Japanese Application No. 2013-079890 filed Apr. 5, 2013, the entire content of which is incorporated herein by reference.

FIELD OF THE INVENTION

At least an embodiment of the present invention may relate to a stepping motor in which a plurality of pole teeth of a stator faces an outer peripheral face of a permanent magnet of a rotor.

BACKGROUND

A stepping motor includes a rotor, which is provided with a permanent magnet on an outer peripheral face of a rotation shaft, and a cylindrical stator in which a plurality of pole teeth facing an outer peripheral face of the permanent magnet is disposed in a circumferential direction, and a rotation angular position of the rotor is controlled by an exciting current which is supplied to a coil of the stator.

CITATION LIST

Patent Literature

Japanese Patent Laid-Open No. 2007-202240
Japanese Patent Laid-Open No. 2009-290925

However, in a stepping motor, even in a case that supplying of an exciting current to a coil is stopped for stopping a rotor at a predetermined position, it may be occurred that, according to the stopping position, the rotor is pulled by a detent torque acted between the permanent magnet of the rotor and the pole teeth of the stator and thus the rotor is stopped at a position which is displaced a little from the predetermined position.

SUMMARY

In view of the problem described above, at least an embodiment of the present invention may advantageously provide a stepping motor in which accuracy of a stopping position of the rotor is enhanced.

According to at least an embodiment of the present invention, there may be provided a stepping motor including a rotor which comprises a rotation shaft and a permanent magnet on an outer peripheral face of the rotation shaft, a fixed body which comprises a cylindrical stator provided with a plurality of pole teeth that are disposed in a circumferential direction so as to face an outer peripheral face of the permanent magnet, an urging member which urges the rotor toward one side in a motor axial line direction, a supported face of the rotor which faces the one side in the motor axial line direction, and a support face of the fixed body which slidably supports the supported face of the rotor on the one side with respect to the supported face. When a first sliding load which is a total sliding load applied to the rotor is "Ta", a detent torque acted on the rotor is "Td", and a dynamic torque acted on the rotor by the stator is "Te", the first sliding load "Ta", the detent torque "Td" and the dynamic torque "Te" satisfy a relationship shown by the following expression:

"Td"<"Ta"<"Te"

In at least an embodiment of the present invention, the stepping motor includes an urging member which urges the rotor toward one side in a motor axial line direction, a supported face of the rotor which faces the one side in the motor axial line direction, and a support face of the fixed body which slidably supports the supported face of the rotor on the one side with respect to the supported face. The first sliding load which is applied to the rotor (total sliding load applied to the rotor) is larger than the detent torque which is acted on the rotor. Therefore, in a case that supply of an exciting current to the stator is stopped for stopping the rotor at a predetermined position, even when a magnetic attraction force (detent torque) between the permanent magnet of the rotor and the pole teeth of the stator is applied to the rotor, the rotor is stopped at the predetermined position by the first sliding load. Accordingly, accuracy of a stopping position of the rotor is enhanced. Further, the first sliding load is smaller than the dynamic torque that the rotor receives from the stator when the motor is driven and thus drive and rotation of the rotor is performed without trouble. In addition, in order to appropriately set the first sliding load, the motor is provided with the urging member which urges the rotor to the one side and the supported face of the rotor facing the one side and the support face of the fixed body are contacted with each other in the motor axial line direction. Therefore, a large sliding load is occurred between the support face and the supported face and the sliding load is relatively large. Accordingly, the first sliding load applied to the rotor can be surely set larger than the detent torque and can be set smaller than the dynamic torque.

In at least an embodiment of the present invention, in the first sliding load "Ta", when a second sliding load between the supported face and the support face is "Tb", the first sliding load "Ta", the second sliding load "Tb", the detent torque "Td" and the dynamic torque "Te" satisfy a relationship shown by the following expression:

"Td"<"Tb"<"Ta"<"Te"

A level of the second sliding load which is occurred between the support face and the supported face is stable and thus, when the first sliding load and the second sliding load are set to be equivalent to each other, the first sliding load applied to the rotor can be surely set larger than the detent torque and can be set smaller than the dynamic torque.

In at least an embodiment of the present invention, the rotor includes a ring-shaped member which is held by the rotation shaft on the one side with respect to the permanent magnet, and the supported face is a face on the one side of the ring-shaped member. According to this structure, the supported face suitable to obtain the predetermined second sliding load can be structured regardless of the materials and the diameters of the rotation shaft and the permanent magnet. Specifically, it may be structured that the fixed body includes a first radial bearing, which rotatably supports the rotation shaft on the one side with respect to the permanent magnet, and a second radial bearing which rotatably supports the rotation shaft on the other side in the motor axial line direction with respect to the permanent magnet, the ring-shaped member is disposed between the permanent magnet and the first radial bearing, and the ring-shaped member is abutted with the first radial bearing by an urging force of the urging member and thereby the second sliding load "Tb" due to abutting of the ring-shaped member with the first radial bearing is set to be larger than the detent torque "Td". In this case, it is preferable that the ring-shaped member is a washer which is formed of resin material superior in abrasion resistance and lubricating ability. Further, it may be structured that a ring-shaped recessed part is formed on an end face of the permanent magnet facing the second radial bearing so as to surround the rotation shaft, and the urging member is a coiled spring which is disposed between the second radial bearing and the permanent magnet for urging the permanent magnet toward the one side, and an end part on the one side of the coiled spring is accommodated in an inside of the ring-shaped recessed part of the permanent magnet. According to this structure, the second sliding load "Tb" can be stably occurred by using a coiled spring and a part of the coiled spring is accommodated in the inside of the ring-shaped recessed part of the permanent magnet and thus the size of the motor in the motor axial line direction can be suppressed.

In at least an embodiment of the present invention, the ring-shaped member is press-fitted to the rotation shaft. According to this structure, the rotation member and the ring-shaped member are integrally rotated with each other and thus the permanent magnet and the ring-shaped member are not slid on each other. Therefore, an unnecessary load is not applied to the permanent magnet and thus deterioration of the permanent magnet can be prevented. Further, in comparison with a case that the ring-shaped member is not press-fitted, a sliding portion between the ring-shaped member and the support face is determined and thus control of the sliding load is easy.

In at least an embodiment of the present invention, the fixed body includes a first radial bearing, which rotatably supports the rotation shaft on the one side with respect to the permanent magnet, and a second radial bearing which rotatably supports the rotation shaft on the other side in the motor axial line direction with respect to the permanent magnet, and the support face is a face of the first radial bearing which faces the other side. According to this structure, the predetermined second sliding load is occurred by utilizing the first radial bearing and thus a separate member is not required to provide in the fixed body.

In at least an embodiment of the present invention, the support face is structured by a cap part on which an end face of the rotation shaft on the one side in the motor axial line direction is slid. According to this structure, since a sliding load (first sliding load "Ta") can be set on an outer side of the stator, control of the sliding load is easy.

In at least an embodiment of the present invention, the cap part is provided with a plate spring part which is urged to the end face of the rotation shaft. According to this structure, the cap part is provided with a plate spring part and thus control of the sliding load is easy.

In at least an embodiment of the present invention, an area of the supported face which slides on the support face facing the other side is equivalent to or less than an area of the support face. According to this structure, the first sliding load which is applied to the rotor can be changed by changing an area of the supported face. In other words, in comparison with a case that an area of the support face formed by the first radial bearing of the fixed body is changed, an area of the supported face is easily changed by changing the ring-shaped member provided in the rotor for manufacturing a stepping motor and the first sliding load is easily adjusted.

In at least an embodiment of the present invention, the first radial bearing is provided with a tube part, which is fixed to the stator directly or through a separate member, and a flange part which is enlarged from the tube part on the other side and whose face on the other side is contacted with the supported face. According to this structure, an area of the support face can be widened and thus the second sliding load can be stably occurred.

In at least an embodiment of the present invention, the urging member is a coiled spring. According to this structure, its spring constant is small and thus a stable urging force can be generated. Therefore, the second sliding load can be stably occurred.

In at least an embodiment of the present invention, the coiled spring is disposed between the permanent magnet and the second radial bearing. According to this structure, even when a coiled spring is added, increase of the size of the stepping motor is suppressed.

In at least an embodiment of the present invention, the first radial bearing is an oil-impregnated sintered bearing. According to this structure, the second sliding load can be occurred stably.

In at least an embodiment of the present invention, the stator has a coil and, when the coil is not energized, a position of a permanent magnet magnetic center virtual plane, which is a virtual plane formed in a radial direction perpendicular to the motor axial line direction at a position of a magnetic center in the motor axial line direction of the permanent magnet of the rotor is disposed at a position displaced to the one side with respect to a stator magnetic center virtual plane which is a virtual plane formed in the radial direction perpendicular to the motor axial line direction at a position of a magnetic center in the motor axial line direction of the stator. According to this structure, when the coil is energized, the permanent magnet is attracted by a magnetic force generated from the coil and thus the rotor is attracted to a magnetically stable position together with the permanent magnet. In other words, when the coil is energized, the permanent magnet is attracted in a direction that the stator magnetic center virtual plane and the permanent magnet magnetic center virtual plane are coincided with each other. Therefore, a force is applied to the rotor in a direction for reducing the urging force by the urging member and thus the first sliding load applied to the rotor can be reduced.

In at least an embodiment of the present invention, the stator is structured so that a first cylindrical stator assembly which is disposed on the one side and a second cylindrical stator assembly which is disposed on the other side are adjacently disposed to each other in the motor axial line direction, the first stator assembly is structured of a first coil which is wound around a first insulator and a pair of first stator cores which are disposed on both sides in the motor axial line direction of the first insulator, the second stator assembly is structured of a second coil which is wound around a second insulator and a pair of second stator cores which are disposed on both sides in the motor axial line direction of the second insulator, and the stator magnetic center virtual plane is located between the first coil and the second coil in the motor axial line direction. According to this structure, the position of the stator magnetic center virtual plane can be changed by changing electric energy supplied to the first stator assembly and the second stator assembly. In other words, the position of the magnetic center of the stator can be adjusted according to the electric energy supplied to the first stator assembly and the second stator assembly and thus the first sliding load applied to the rotor can be adjusted.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

A stepping motor to which at least an embodiment of the present invention is applied will be described below with reference to the accompanying drawings. In the following description, a side where a rotation shaft is protruded is referred to as an "output side "L1"" in a motor axial line direction "L" and an opposite side to the side where the rotation shaft is protruded is referred to as an "opposite-to-output side "L2"". Further, a sliding load described in the present application means friction occurring in a sliding portion in order to restrain movement of a rotor by a detent torque after electric power to the stepping motor is cut off and the rotor is stopped relative to the stator. In other words, sliding friction is a frictional force, i.e., a static frictional force which is acted on the stopped rotor to move.

First Embodiment

Figure 1:
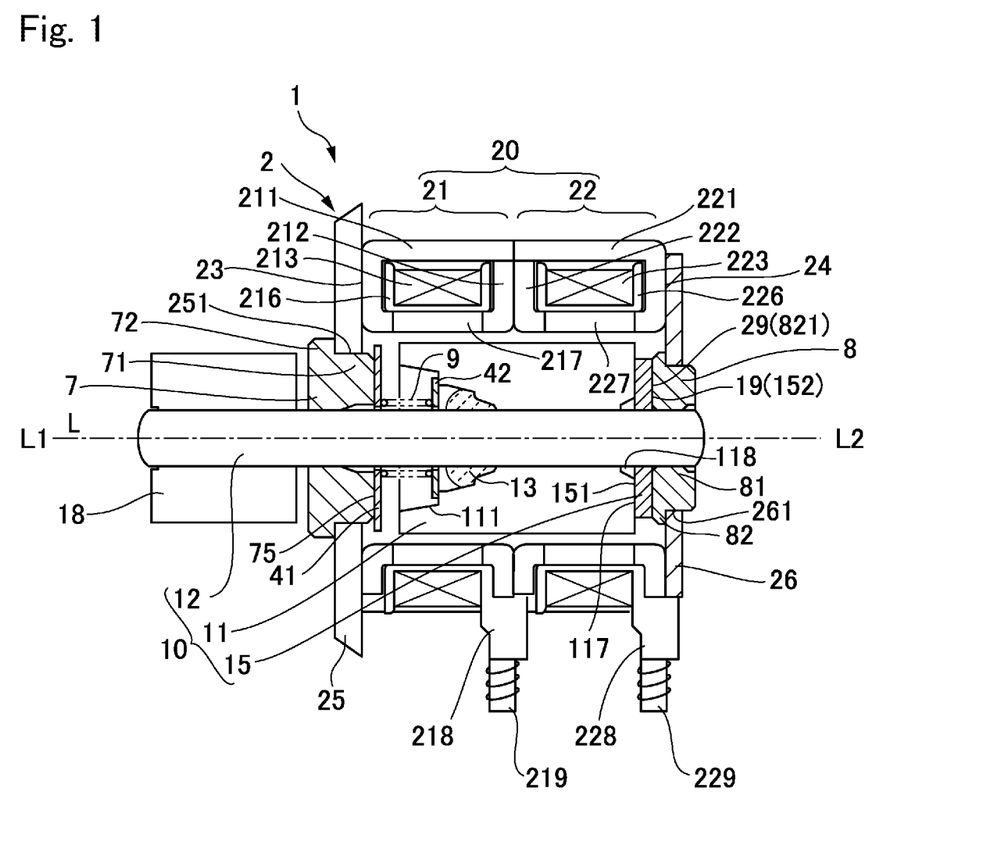
FIG. 1 is a cross-sectional view showing a stepping motor in accordance with a first embodiment of the present invention.

The first embodiment is an embodiment in which an urging member 9 urges a rotor 10 to the opposite-to-output side "L2" in the motor axial line direction "L". Therefore, "one side in the motor axial line direction "L"" in the present application corresponds to an opposite-to-output side "L2" and "the other side in the motor axial line direction "L"" in the present application corresponds to an output side "L1". Further, in two radial bearings which are disposed on the output side "L1" and the opposite-to-output side "L2" in the motor axial line direction "L", the opposite-to-output side radial bearing 8 disposed on the opposite-to-output side "L2" corresponds to a "first radial bearing" in the present application and the output side radial bearing 7 disposed on the output side "L1" corresponds to a "second radial bearing" in the present application.

(Entire Structure)

Figure 2:
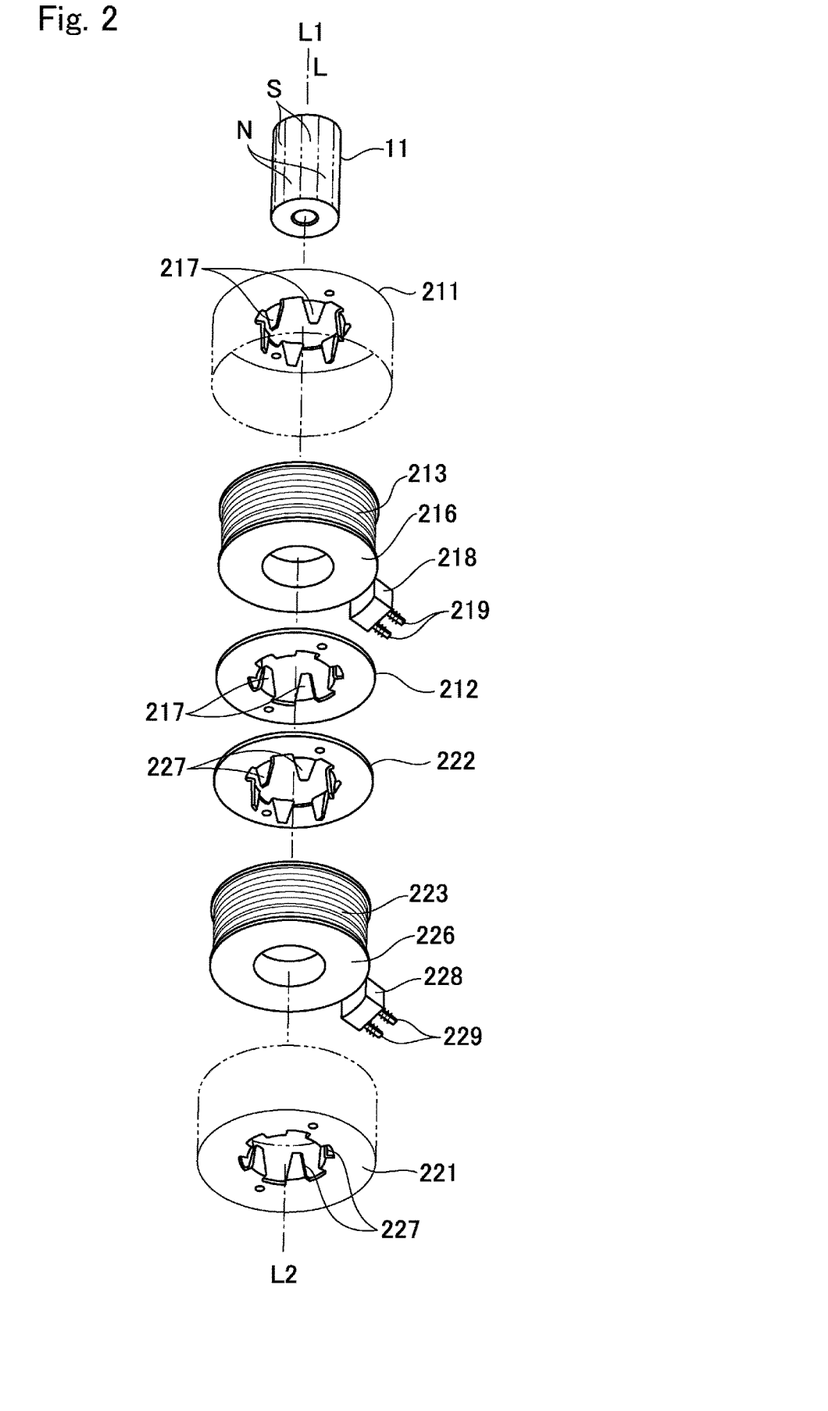
FIG. 2 is an explanatory view showing a stator and the like of a stepping motor in accordance with the first embodiment of the present invention.

FIG. 1 is a cross-sectional view showing a stepping motor in accordance with a first embodiment of the present invention. FIG. 2 is an explanatory perspective view showing a stator and the like of a stepping motor in accordance with the first embodiment of the present invention.

As shown in FIGS. 1 and 2, a stepping motor 1 in this embodiment includes a rotor 10 having a permanent magnet 11 on an outer peripheral face of a rotation shaft 12 and a fixed body 2 having a cylindrical stator 20 which faces an outer peripheral face of the permanent magnet 11. An "N"-pole and an "S"-pole are alternately disposed on the outer peripheral face of the permanent magnet 11 in a circumferential direction. A gear 18 is fixed to an output side "L1" of the rotation shaft 12. In this embodiment, a ring-shaped recessed part 111 having a stepped part is formed on an end face on the output side "L1" of the permanent magnet 11, in other words, on an end face of the permanent magnet 11 on a side of the output side radial bearing 7 corresponding to the second radial bearing, so as to be opened while enlarging toward the output side "L1" from the opposite-to-output side "L2" side and so as to surround the rotation shaft 12. The permanent magnet 11 and the rotation shaft 12 are fixed to each other by an adhesive 13 which is applied to an inner side of the ring-shaped recessed part 111.

The stator 20 includes a stator assembly 21 (second stator assembly) and a stator assembly 22 (first stator assembly) in pairs which are disposed so as to be superposed on each other in the motor axial line direction "L". The respective stator assemblies 21 and 22 include a coil 213 (second coil) and a coil 223 (first coil), which are wound around an insulator 216 (second insulator) and an insulator 226 (first insulator) and stator cores 211 and 212 (pair of the second stator cores) and stator cores 221 and 222 (pair of the first stator cores) which are disposed on both sides of the insulators 216 and 226 in the motor axial line direction "L". The stator core 211 is an outer stator core covering a face on the output side "L1" of the insulator 216 and the stator core 212 is an inner stator core covering a face on the opposite-to-output side "L2" of the insulator 216. The stator core 221 is an outer stator core covering a face on the opposite-to-output side "L2" of the insulator 226 and the stator core 222 is an inner stator core covering a face on the output side "L1" of the insulator 226. The stator cores 211 and 221 are formed in a "U"-shape in cross section and a motor case is structured of tube-shaped parts on their outer peripheral sides.

In the stator 20, respective stator cores 211, 212, 221 and 222 are provided with a plurality of pole teeth 217 and 227 which are stood up along the inner peripheral faces of the insulators 216 and 226. In a state that the stator assembly 21 has been structured, the pole teeth 217 formed in the stator core 211 are interposed between the pole teeth 217 formed in the stator core 212, and the pole teeth 217 formed in the stator core 211 and the pole teeth 217 formed in the stator core 212 are alternately disposed in a circumferential direction. Further, in a state that the stator assembly 22 has been structured, the pole teeth 227 formed in the stator core 221 are interposed between the pole teeth 227 formed in the stator core 222, and the pole teeth 227 formed in the stator core 221 and the pole teeth 227 formed in the stator core 222 are alternately disposed in the circumferential direction.

Terminal blocks 218 and 228 are integrally formed in the insulators 216 and 226 and terminals 219 and 229 are fixed to the terminal blocks 218 and 228.

In the fixed body 2, an output side end plate 25 is fixed to an end face 23 on the output side "L1" of the stator 20 and an opposite-to-output side end plate 26 is fixed to an end face 24 on the opposite-to-output side "L2" of the stator 20.

(Bearing Structure)

In this embodiment, an output side radial bearing 7 (second radial bearing) which rotatably supports the rotation shaft 12 on the output side "L1" is held by utilizing the output side end plate 25 and the output side radial bearing 7 rotatably supports a portion of the rotation shaft 12 which is located on the output side "L1" with respect to the permanent magnet 11. More specifically, a hole 251 is formed in the output side end plate 25 and the output side radial bearing 7 is held by the output side end plate 25 in a fitted state into the hole 251. The output side radial bearing 7 is provided with a tube part 71 which is fitted into the hole 251 and a flange part 72 which is enlarged from the tube part 71 on the output side "L1" and is provided with a larger diameter than the tube part 71. The output side radial bearing 7 is fixed to the output side end plate 25 by caulking an outer side edge of the tube part 71, which is further protruded to the opposite-to-output side "L2" relative to a face on the opposite-to-output side "L2" of the output side end plate 25, to a face on the opposite-to-output side "L2" of the output side end plate 25 in a state that a face on the opposite-to-output side "L2" of the flange part 72 is overlapped with a face on the output side "L1" of the output side end plate 25. The output side radial bearing 7 is made of an oil-impregnated sintered bearing.

An opposite-to-output side radial bearing 8 which rotatably supports the rotation shaft 12 on the opposite-to-output side "L2" is held by utilizing the opposite-to-output side end plate 26 and the opposite-to-output side radial bearing 8 rotatably supports a portion of the rotation shaft 12 which is located on the opposite-to-output side "L2" with respect to the permanent magnet 11. More specifically, a hole 261 is formed in the opposite-to-output side end plate 26 and the opposite-to-output side radial bearing 8 is held by the opposite-to-output side end plate 26 in a fitted state into the hole 261. The opposite-to-output side radial bearing 8 is provided with a tube part 81 which is fitted into the hole 261 and a flange part 82 which is enlarged from the tube part 81 on the output side "L1" and is provided with a larger diameter than the tube part 81. The opposite-to-output side radial bearing 8 is fixed to the opposite-to-output side end plate 26 by caulking an outer side edge of the tube part 81, which is further protruded to the opposite-to-output side "L2" relative to a face on the opposite-to-output side "L2" of the opposite-to-output side end plate 26, to a face on the opposite-to-output side "L2" of the opposite-to-output side end plate 26 in a state that a face on the opposite-to-output side "L2" of the flange part 82 is overlapped with a face on the output side "L1" of the opposite-to-output side end plate 26. The opposite-to-output side radial bearing 8 is made of an oil-impregnated sintered bearing.

(Structure of Urging Member 9, Support Face 29 and Supported Face 19)

In the stepping motor 1, an urging member 9 for urging the rotation shaft 12 to the opposite-to-output side "L2" is disposed between the output side radial bearing 7 and the rotor 10. In this embodiment, the urging member 9 is made of a coiled spring and is disposed around the rotation shaft 12. In order to arrange the urging member 9 (coiled spring), in this embodiment, an end part on the opposite-to-output side "L2" of the urging member 9 is accommodated in an inside of the ring-shaped recessed part 111 of the permanent magnet 11. In other words, since a part of the urging member 9 (coiled spring) is accommodated in the inside of the ring-shaped recessed part 111 of the permanent magnet 11, increase of the size of the motor in the motor axial line direction "L" can be suppressed. A ring-shaped washer 41 attached to the rotation shaft 12 is disposed between an end part on the output side "L1" of the urging member 9 and an end face 75 on the opposite-to-output side "L2" of the output side radial bearing 7, and a ring-shaped washer 42 attached to the rotation shaft 12 is disposed between an end part on the opposite-to-output side "L2" of the urging member 9 and a step part of the ring-shaped recessed part 111. Therefore, when the rotation shaft 12 is rotated, one or both of a portion between the washer 41 and the end part on the output side "L1" of the urging member 9 and a portion between the washer 42 and the end part on the opposite-to-output side "L2" of the urging member 9 is (or are) acted as a sliding portion(s). In this embodiment, the washer 41 has a larger diameter than the washer 42. The washer 41 is fitted to the rotation shaft 12 in a movable state in the motor axial line direction "L". The washer 42 may be fitted to the rotation shaft 12 in a movable state in the motor axial line direction "L" and, alternatively, the washer 42 may be press-fitted to the rotation shaft 12 so as not to be able to move in the motor axial line direction "L". In this embodiment, the washers 41 and 42 are fitted to the rotation shaft 12 in a movable state in the motor axial line direction "L".

In the stepping motor 1 in this embodiment, a ring-shaped member 15 is attached to a portion of the rotation shaft 12 which is located between the permanent magnet 11 and the opposite-to-output side radial bearing 8. A face 151 on the output side "L1" of the ring-shaped member 15 is contacted with a face 117 on the opposite-to-output side "L2" of the permanent magnet 11. The face 117 on the opposite-to-output side "L2" of the permanent magnet 11 is formed with a recessed part 118 so as to surround the rotation shaft 12, and a face 151 on the output side "L1" of the ring-shaped member 15 is contacted with the face 117 on the opposite-to-output side "L2" of the permanent magnet 11 on an outer side in the radial direction with respect to the recessed part 118. An outer diameter dimension of the ring-shaped member 15 is smaller than an outer diameter dimension of the permanent magnet 11. A metal member may be used as the ring-shaped member 15 and a member made of resin may be used as the ring-shaped member 15. In this embodiment, the ring-shaped member 15 is made of resin. In this embodiment, the ring-shaped member 15 is a member made of resin material superior in abrasion resistance and lubricating ability. A washer is preferably used as the ring-shaped member 15, which is made of fluororesin, for example, Teflon (registered trademark) or nylon, or, for example, a Polyslider (registered trademark).

A face 152 on the opposite-to-output side "L2" of the ring-shaped member 15 is contacted with a face 821 on the output side "L1" on the opposite-to-output side radial bearing 8 and the face 152 on the opposite-to-output side "L2" of the ring-shaped member 15 is elastically pressed against the face 821 on the output side "L1" of the opposite-to-output side radial bearing 8 by an urging force of the urging member 9. An outer diameter dimension of the ring-shaped member 15 is substantially equivalent to the flange part 82 of the opposite-to-output side radial bearing 8.

In this embodiment, a face 151 on the output side "L1" of the ring-shaped member 15 is contacted with a face on the opposite-to-output side "L2" of the permanent magnet 11 so as to be unable to slide and, on the other hand, the face 152 on the opposite-to-output side "L2" of the ring-shaped member 15 is capable of sliding on the face 821 on the output side "L1" of the opposite-to-output side radial bearing 8. Therefore, in this embodiment, a supported face 19 of the rotor 10 which faces toward the opposite-to-output side "L2" in the motor axial line direction "L" is structured by the face 152 on the opposite-to-output side "L2" of the ring-shaped member 15. On the other hand, in the fixed body 2, a support face 29 is structured on the opposite-to-output side "L2" with respect to the supported face 19 by the face 821 on the output side "L1" of the opposite-to-output side radial bearing 8 so that the supported face 19 of the rotor 10 is slidably supported.

The ring-shaped member 15 may be fitted to the rotation shaft 12 in a movable state in the motor axial line direction "L" and, alternatively, the ring-shaped member 15 may be press-fitted to the rotation shaft 12 so as not to be moved in the motor axial line direction "L". In this embodiment, the ring-shaped member 15 is press-fitted and fixed to the rotation shaft 12 so as to be unable to move in the motor axial line direction "L".

(Sliding Load to Rotor 10)

In the stepping motor 1, the following sliding portions are existed between the fixed body 2 and the rotor 10. In other words, the sliding portions are a sliding portion between the support face 29 of the fixed body 2 (face 821 on the output side "L1" of the opposite-to-output side radial bearing 8) and the supported face 19 of the rotor 10 (face 152 on the opposite-to-output side "L2" of the ring-shaped member 15), a sliding portion between the opposite-to-output side radial bearing 8 and the rotation shaft 12, a sliding portion between the output side radial bearing 7 and the rotation shaft 12, a sliding portion between the washer 41 and the end part on the output side "L1" of the urging member 9, and a sliding portion between the washer 42 and the end part on the opposite-to-output side "L2" of the urging member 9. As a result, a first sliding load "Ta" is applied to the rotor 10 in total. Originally, the stepping motor 1 is designed so that, when the rotor 10 is rotated, a sliding portion between the fixed body 2 and the rotor 10 is reduced and a sliding load (first sliding load "Ta") is reduced. However, in this embodiment, a sliding load (first sliding load "Ta") occurred between the fixed body 2 and the rotor 10 is utilized.

In this embodiment, a sliding load (second sliding load "Tb") in the sliding portion between the support face 29 of the fixed body 2 (face 821 on the output side "L1" of the opposite-to-output side radial bearing 8) and the supported face 19 of the rotor 10 (face 152 on the opposite-to-output side "L2" of the ring-shaped member 15) is set to be larger in comparison with respective sliding loads in the sliding portion between the opposite-to-output side radial bearing 8 and the rotation shaft 12, the sliding portion between the output side radial bearing 7 and the rotation shaft 12, the sliding portion between the washer 41 and the end part on the output side "L1" of the urging member 9, and the sliding portion between the washer 42 and the end part on the opposite-to-output side "L2" of the urging member 9. Further, the sliding load (second sliding load "Tb") in the sliding portion between the support face 29 of the fixed body 2 (face 821 on the output side "L1" of the opposite-to-output side radial bearing 8) and the supported face 19 of the rotor 10 (face 152 on the opposite-to-output side "L2" of the ring-shaped member 15) is smaller in comparison with the entire sliding load (first sliding load "Ta") which is applied to the rotor 10. Therefore, the first sliding load "Ta" and the second sliding load "Tb" satisfy the relationship shown by the following expression:

the second sliding load "Tb"<the first sliding load "Ta"

Further, in the stepping motor 1, a detent torque is acted between the rotor 10 and the pole teeth 217 and 227 of the stator 20 provided in the fixed body 2 according to strength of flow when magnetic flux generated from the permanent magnet 11 flows to the stator 20. Further, when the rotor 10 is driven and rotated, a dynamic torque acts on the rotor 10 by a magneto-motive force generated from the stator 20.

Regarding the above-mentioned torque, in the stepping motor 1 in this embodiment, the first sliding load "Ta" is set to satisfy the relationship with respect to the detent torque "Td" and the dynamic torque "Te" as shown by the following expression:

"Td"<"Ta"<"Te"

In this embodiment, the first sliding load "Ta" and the second sliding load "Tb" satisfy the relationship as shown by the following expression:

the second sliding load "Tb"<the first sliding load "Ta"

Therefore, the first sliding load "Ta" and the second sliding load "Tb" are set to satisfy the relationship with respect to the detent torque "Td" and the dynamic torque "Te" as shown by the following expression:

"Td"<"Tb"<"Ta"<"Te"

(Principal Effects in this Embodiment)

As described above, the stepping motor 1 in this embodiment includes the urging member 9, which urges the rotor 10 toward the opposite-to-output side "L2" in the motor axial line direction "L", and the support face 29 in the fixed body 2 which slidably supports the supported face 19 facing the opposite-to-output side "L2" of the rotor 10, and the first sliding load "Ta" which is applied to the rotor 10 is set to be larger than the detent torque "Td" acted on the rotor 10. Therefore, in a case that supply of an exciting current to the stator 20 is stopped for stopping the rotor 10 at a predetermined position, even when a magnetic attraction force (detent torque "Td") between the permanent magnet 11 of the rotor 10 and the pole teeth 217 and 227 of the stator 20 is applied to the rotor 10, the rotor 10 is not pulled by the detent torque "Td" in the circumferential direction and the rotor 10 is stopped at a predetermined position by the first sliding load "Ta". Accordingly, accuracy of a stopping position of the rotor 10 can be enhanced. As a result, resolution of a stopping position of the rotor 10 can be enhanced without increasing the number of poles of the stepping motor 1. Further, the first sliding load "Ta" is smaller than the dynamic torque "Te" that the rotor 10 receives from the stator 20 and thus drive and rotation of the rotor 10 is performed without trouble. In accordance with an embodiment of the present invention, it is preferable that the first sliding load "Ta" is set to be slightly larger than the detent torque "Td" and the dynamic torque "Te" is set to be extremely larger than the first sliding load "Ta", in other words, the relationship as shown by the following expression is satisfied:

"Td"<"Ta"<<"Te"

According to this relationship, a loss of the dynamic torque "Te" is suppressed.

In addition, in order to appropriately set the first sliding load "Ta", the motor is provided with the urging member 9 which urges the rotor 10 to the opposite-to-output side "L2" and the supported face 19 of the rotor 10 facing the opposite-to-output side "L2" and the support face 29 of the fixed body 2 are contacted with each other in the motor axial line direction "L". Therefore, a large second sliding load "Tb" is occurred between the support face 29 and the supported face 19 and, since the second sliding load "Tb" is a sliding load which is occurred in a surface-contact portion in the motor axial line direction "L", the second sliding load "Tb" is large in comparison with the sliding loads in other sliding portions. Further, the second sliding load "Tb" which is occurred between the support face 29 and the supported face 19 is a sliding load occurred in a surface-contact portion in the motor axial line direction "L" and thus the second sliding load "Tb" is stable in comparison with the sliding loads occurred in other sliding portions. Accordingly, the first sliding load "Ta" which is applied to the rotor 10 can be surely set larger than the detent torque "Td" and set smaller than the dynamic torque "Te".

Further, in this embodiment, the ring-shaped member 15 which is held by the rotation shaft 12 is provided in the rotor 10 on the opposite-to-output side "L2" with respect to the permanent magnet 11 and the face 152 on the opposite-to-output side "L2" of the ring-shaped member 15 is utilized as the supported face 19. Therefore, the supported face 19 suitable to obtain a predetermined second sliding load "Tb" can be structured regardless of the materials and the diameters of the rotation shaft 12 and the permanent magnet 11.

Further, in this embodiment, the support face 29 is structured by the face 821 which faces the output side "L1" of the opposite-to-output side radial bearing 8. Therefore, a separate member is not required to provide in the fixed body 2 for occurring the second sliding load "Tb". In addition, the opposite-to-output side radial bearing 8 is provided with the tube part 81, which is fixed to the stator 20 through the opposite-to-output side end plate 26 (another separate member), and the flange part 82 which is enlarged from the tube part 81 on the output side "L1" and is provided with the face contacted with the supported face 19 on the output side "L1". Therefore, the area of the support face 29 is large and thus the second sliding load "Tb" can be stably occurred. Further, the opposite-to-output side radial bearing 8 is an oil-impregnated sintered bearing and thus the second sliding load "Tb" can be stably occurred.

Further, the urging member 9 is structured of a coiled spring and thus its spring constant is small. Therefore, a stable urging force can be generated and thus the second sliding load "Tb" can be stably occurred. Further, the urging member 9 (coiled spring) is disposed between the permanent magnet 11 and the output side radial bearing 7 and thus, even when the urging member 9 is added, increase of the size of the stepping motor 1 can be suppressed. In accordance with an embodiment of the present invention, instead of adjusting an urging force by changing the coiled spring, an urging force of the coiled spring may be adjusted so that an urging force of the coiled spring is set to be constant without changing and thickness of a washer is changed.

Figure 6:
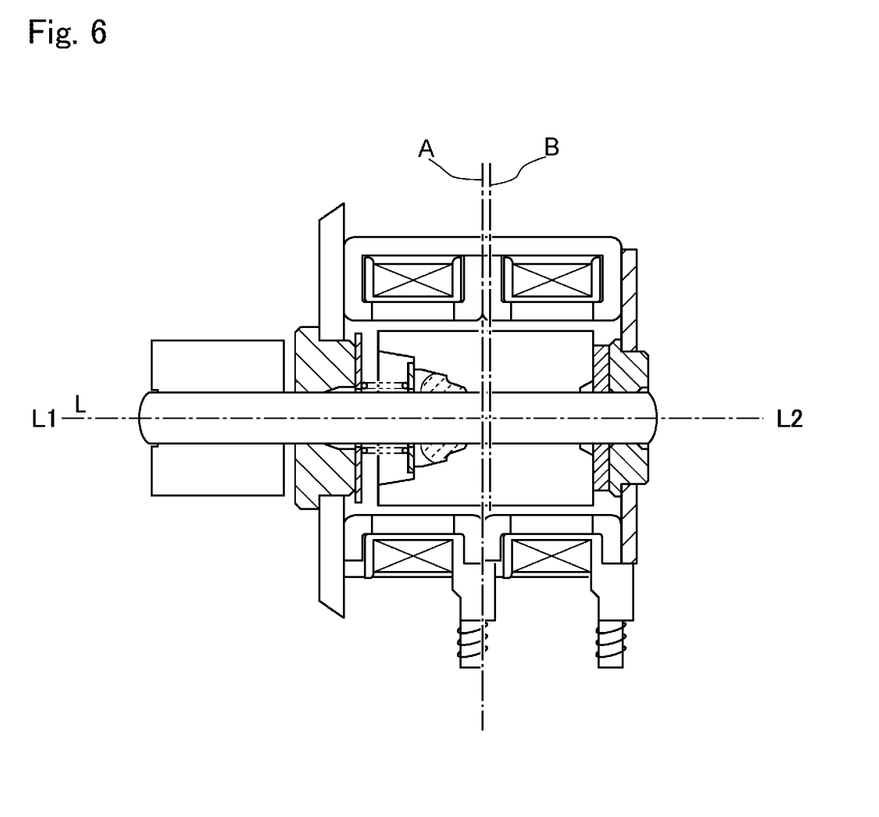
FIG. 6 is a view showing positions of a magnetic center of a stator and a magnetic center of a rotor of a stepping motor in accordance with the first embodiment of the present invention.

Further, in this embodiment, the stator 20 includes the coil 213 (second coil) and the coil 223 (first coil) and thus, it may be structured that, when the coils 213 and 223 are not energized, a position of the permanent magnet magnetic center virtual plane "B", which is a virtual plane formed in the radial direction perpendicular to the motor axial line direction "L" at a position of the magnetic center in the motor axial line direction "L" of the permanent magnet 11 of the rotor 10 is set to be disposed at a position displaced to the one side (opposite-to-output side "L2") with respect to a stator magnetic center virtual plane "A" which is a virtual plane formed in the radial direction perpendicular to the motor axial line direction "L" at a position of the magnetic center in the motor axial line direction "L" of the stator 20 (see FIG. 6) and, in this state, the second sliding load "Tb" is applied to the rotor 10. In this case, when the coils 213 and 223 are energized, the permanent magnet 11 is attracted by a magnetic force generated from the coils 213 and 223 and thus the rotor 10 is attracted together with the permanent magnet 11 to a magnetically stable position and a normal rotational operation is performed. In other words, when the coils 213 and 223 are energized, the rotor 10 and the permanent magnet 11 are attracted so that the stator magnetic center virtual plane "A" and the permanent magnet magnetic center virtual plane "B" are coincided with each other. Therefore, a force is applied to the rotor in a direction reducing the urging force by the urging member 9 (coiled spring) and thus the second sliding load "Tb", in other words, the first sliding load "Ta" applied to the rotor 10 can be reduced. Further, when the coils 213 and 223 are not energized, the second sliding load "Tb" is applied to the rotor 10 and the rotor can be stopped at a predetermined position.

Further, in this embodiment, the stator 20 is arranged so that the first cylindrical stator assembly 22 disposed on the one side and the second cylindrical stator assembly 21 disposed on the other side are disposed to be adjacent to each other in the motor axial line direction "L". The first stator assembly 22 is structured of the first coil 223 wound around the first insulator 226 and a pair of the first stator cores 221 and 222 disposed on both sides in the motor axial line direction "L" of the first insulator 226, and the second stator assembly 21 is structured of the second coil 213 wound around the second insulator 216 and a pair of the second stator cores 211 and 212 disposed on both sides in the motor axial line direction "L" of the second insulator 216. Further, the stator magnetic center virtual plane "A" is formed between the first coil 223 and the second coil 213 in the motor axial line direction "L". Therefore, the position of the stator magnetic center virtual plane "A" can be changed by changing electric energy supplied to the first stator assembly 22 and the second stator assembly 21. In other words, the position of the magnetic center of the stator 20 can be adjusted according to the electric energy supplied to the first stator assembly 22 and the second stator assembly 21 and thus the second sliding load "Tb", in other words, the first sliding load "Ta" which is applied to the rotor 10 can be adjusted.

Second Embodiment

Figure 3:
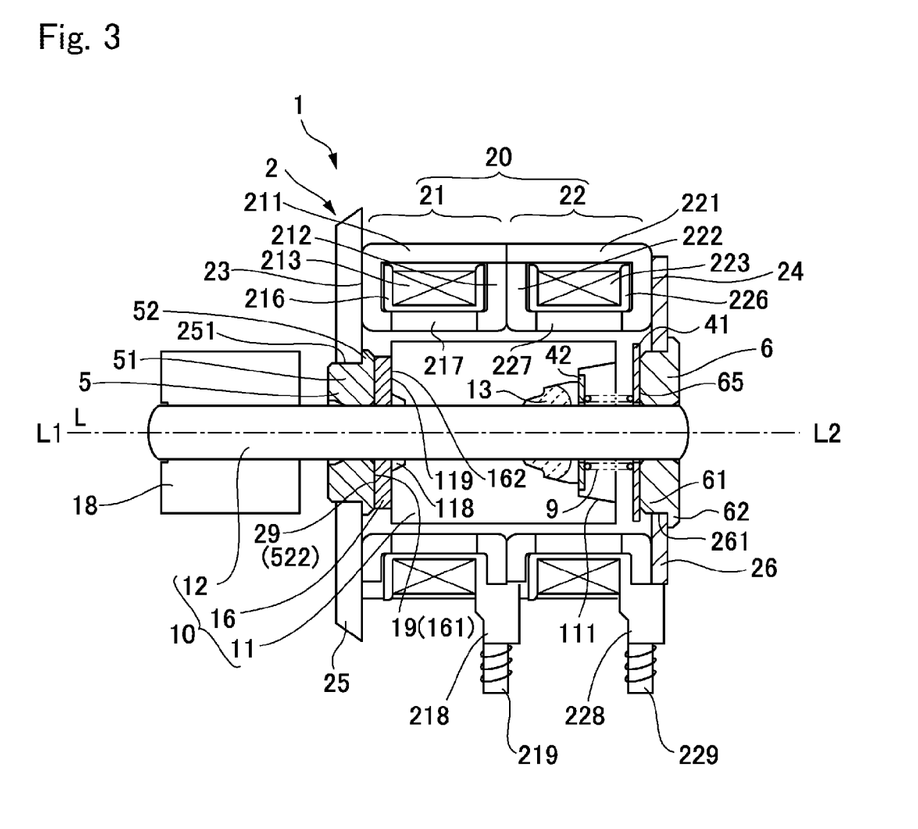
FIG. 3 is a cross-sectional view showing a stepping motor in accordance with a second embodiment of the present invention.

FIG. 3 is a cross-sectional view showing a stepping motor in accordance with a second embodiment of the present invention. Basic structure in this embodiment is similar to the first embodiment and thus the same reference signs are used in common portions in the drawing and their detailed descriptions are omitted.

In the second embodiment, different from the first embodiment, the urging member 9 urges the rotor 10 to the output side "L1" in the motor axial line direction "L". Therefore, in the second embodiment, "one side in the motor axial line direction "L"" in the present application corresponds to the output side "L1" and "the other side in the motor axial line direction "L"" in the present application corresponds to the opposite-to-output side "L2". Further, in two radial bearings which are disposed on the output side "L1" and the opposite-to-output side "L2" in the motor axial line direction "L", the output side radial bearing 5 disposed on the output side "L1" corresponds to a "first radial bearing" in the present application and the opposite-to-output side radial bearing 6 disposed on the opposite-to-output side "L2" corresponds to a "second radial bearing" in the present application.

As shown in FIG. 3, a stepping motor 1 in this embodiment includes, similarly to the first embodiment, a rotor 10 having a permanent magnet 11 on an outer peripheral face of a rotation shaft 12 and a fixed body 2 having a cylindrical stator 20 which faces an outer peripheral face of the permanent magnet 11. An "N"-pole and an "S"-pole are alternately disposed on an outer peripheral face of the permanent magnet 11 in a circumferential direction. In this embodiment, a ring-shaped recessed part 111 having a stepped part is formed on an end face on the opposite-to-output side "L2" of the permanent magnet 11 and the permanent magnet 11 and the rotation shaft 12 are fixed to each other by an adhesive 13 applied to an inner side of the ring-shaped recessed part 111.

In this embodiment, an output side radial bearing 5 (first radial bearing) which rotatably supports the rotation shaft 12 on the output side "L1" is held by utilizing an output side end plate 25 and the output side radial bearing 5 rotatably supports a portion of the rotation shaft 12 located on the output side "L1" with respect to the permanent magnet 11. More specifically, a hole 251 is formed in the output side end plate 25 and the output side radial bearing 5 is held by the output side end plate 25 in a fitted state into the hole 251. The output side radial bearing 5 is provided with a tube part 51 which is fitted into the hole 251 and a flange part 52 which is enlarged from the tube part 51 on the opposite-to-output side "L2" and is provided with a larger diameter than the tube part 51. The output side radial bearing 5 is fixed to the output side end plate 25, for example, by caulking an outer side edge of the tube part 51 to the output side end plate 25 in a state that a face on the output side "L1" of the flange part 52 is overlapped with a face on the opposite-to-output side "L2" of the output side end plate 25. The output side radial bearing 5 is made of an oil-impregnated sintered bearing.

An opposite-to-output side radial bearing 6 (second radial bearing) which rotatably supports the rotation shaft 12 on the opposite-to-output side "L2" is held by utilizing the opposite-to-output side end plate 26 and the opposite-to-output side radial bearing 6 rotatably supports a portion of the rotation shaft 12 which is located on the opposite-to-output side "L2" with respect to the permanent magnet 11. More specifically, a hole 261 is formed in the opposite-to-output side end plate 26 and the opposite-to-output side radial bearing 6 is held by the opposite-to-output side end plate 26 in a fitted state into the hole 261. The opposite-to-output side radial bearing 6 is provided with a tube part 61 which is fitted into the hole 261 and a flange part 62 which is enlarged from the tube part 61 on the opposite-to-output side "L2" and is provided with a larger diameter than the tube part 61. An outer side end of the tube part 61 and the opposite-to-output side end plate 26 are fixed to each other by caulking or the like in a state that a face on the output side "L1" of the flange part 62 is overlapped with a face on the opposite-to-output side "L2" of the opposite-to-output side end plate 26. The opposite-to-output side radial bearing 6 is made of an oil-impregnated sintered bearing.

In the stepping motor 1, an urging member 9 for urging the rotation shaft 12 to the output side "L1" is disposed between the opposite-to-output side radial bearing 6 and the rotor 10. In this embodiment, the urging member 9 is made of a coiled spring and is disposed around the rotation shaft 12. In order to arrange the urging member 9 (coiled spring), in this embodiment, an end part on the output side "L1" of the urging member 9 is accommodated in an inside of the ring-shaped recessed part 111 of the permanent magnet 11. A ring-shaped washer 41 attached to the rotation shaft 12 is disposed between an end part on the opposite-to-output side "L2" of the urging member 9 and an end face 65 on the output side "L1" of the opposite-to-output radial bearing 6, and a ring-shaped washer 42 attached to the rotation shaft 12 is disposed between an end part on the output side "L1" of the urging member 9 and a step part of the ring-shaped recessed part 111. Therefore, when the rotation shaft 12 is rotated, one or both of a portion between the washer 41 and the end part on the opposite-to-output side "L2" of the urging member 9 and a portion between the washer 42 and an end part on the output side "L1" of the urging member 9 is (are) acted as a sliding portion(s). In this embodiment, the washer 41 has a larger diameter than the washer 42.

Further, in the stepping motor 1 in this embodiment, a ring-shaped member 16 is attached to a portion of the rotation shaft 12 which is located between the permanent magnet 11 and the output side radial bearing 5. A face 162 on the opposite-to-output side "L2" of the ring-shaped member 16 is contacted with a face 119 on the output side "L1" of the permanent magnet 11. The face 119 on the output side "L1" of the permanent magnet 11 is formed with a recessed part 118 so as to surround the rotation shaft 12, and a face 162 on the opposite-to-output side "L2" of the ring-shaped member 16 is contacted with the face 119 on the output side "L1" of the permanent magnet 11 on an outer side in the radial direction with respect to the recessed part 118. An outer diameter dimension of the ring-shaped member 16 is smaller than an outer diameter dimension of the permanent magnet 11. A metal member may be used as the ring-shaped member 16 and a member made of resin may be used. In this embodiment, the ring-shaped member 16 is made of resin.

A face 161 on the output side "L1" of the ring-shaped member 16 is contacted with a face 522 on the opposite-to-output side "L2" on the output side radial bearing 5 and the face 161 on the output side "L1" of the ring-shaped member 16 is elastically pressed against the face 522 on the opposite-to-output side "L2" of the output side radial bearing 5 by an urging force of the urging member 9. An outer diameter dimension of the ring-shaped member 16 is substantially equivalent to the flange part 52 of the output side radial bearing 5.

In this embodiment, the face 162 on the opposite-to-output side "L2" of the ring-shaped member 16 is contacted with the face on the output side "L1" of the permanent magnet 11 so as to be unable to slide and, on the other hand, the face 161 on the output side "L1" of the ring-shaped member 16 is capable of sliding on the face 522 on the opposite-to-output side "L2" of the output side radial bearing 5. Therefore, in this embodiment, a supported face 19 of the rotor 10 which faces toward the output side "L1" in the motor axial line direction "L" is structured by the face 161 on the output side "L1" of the ring-shaped member 16. On the other hand, in the fixed body 2, a support face 29 is structured on the output side "L1" with respect to the supported face 19 by the face 522 on the opposite-to-output side "L2" of the output side radial bearing 5 so that the supported face 19 of the rotor 10 is slidably supported.

The ring-shaped member 16 may be fitted to the rotation shaft 12 in a movable state in the motor axial line direction "L" and, alternatively, the ring-shaped member 16 may be press-fitted to the rotation shaft 12 so as to be unable to move in the motor axial line direction "L". In this embodiment, the ring-shaped member 16 is press-fitted and fixed to the rotation shaft 12 so as to be unable to move in the motor axial line direction "L".

In the above-mentioned stepping motor 1, the following sliding portions are existed between the fixed body 2 and the rotor 10. In other words, the sliding portions are a sliding portion between the support face 29 of the fixed body 2 (face 522 on the opposite-to-output side "L2" of the output side radial bearing 5) and the supported face 19 of the rotor 10 (face 161 on the output side "L1" of the ring-shaped member 16), a sliding portion between the output side radial bearing 5 and the rotation shaft 12, a sliding portion between the opposite-to-output side radial bearing 6 and the rotation shaft 12, a sliding portion between the washer 41 and the end part on the opposite-to-output side "L2" of the urging member 9, and a sliding portion between the washer 42 and the end part on the output side "L1" of the urging member 9. As a result, a first sliding load "Ta" (total sliding load applied to the rotor 10) is applied to the rotor 10.

In the total sliding load applied to the rotor 10 (first sliding load "Ta"), a sliding load (second sliding load "Tb") in a sliding portion between the support face 29 of the fixed body 2 and the supported face 19 of the rotor 10 is larger than sliding loads in other sliding portions. Further, also in the second embodiment, similarly to the first embodiment, the first sliding load "Ta" and the second sliding load "Tb" satisfy the relationship shown by the following expression:

the second sliding load "Tb"<the first sliding load "Ta"

Further, also in the second embodiment, similarly to the first embodiment, the first sliding load "Ta" and the second sliding load "Tb" are set to satisfy the relationship with respect to the detent torque "Td" and the dynamic torque "Te" as shown by the following expression:

"Td"<"Tb"<"Ta"<"Te"

Therefore, also in the stepping motor 1 in this embodiment, similarly to the first embodiment, in a case that supply of an exciting current to the stator 20 is stopped for stopping the rotor 10 at a predetermined position, even when the detent torque "Td" is applied to the rotor 10, the rotor 10 is stopped at a predetermined position by the first sliding load "Ta". Accordingly, accuracy of a stopping position of the rotor 10 can be enhanced. Further, in order to appropriately set the first sliding load "Ta", the motor is provided with the urging member 9 which urges the rotor 10 to the output side "L1" and the supported face 19 of the rotor 10 facing the output side "L1" and the support face 29 of the fixed body 2 are contacted with each other in the motor axial line direction "L". Therefore, a large second sliding load "Tb" is occurred between the support face 29 and the supported face 19 and the second sliding load "Tb" is larger than those of the sliding loads in other sliding portions and, in addition, the second sliding load "Tb" is stable. Accordingly, similar effects to the first embodiment can be attained, for example, the first sliding load "Ta" which is applied to the rotor 10 can be surely set larger than the detent torque "Td" and set smaller than the dynamic torque "Te".

Further, also in the stepping motor in accordance with the second embodiment, when the coils 213 and 223 are not energized, a position of the permanent magnet magnetic center virtual plane "B", which is a virtual plane formed in the radial direction perpendicular to the motor axial line direction "L" at a position of the magnetic center in the motor axial line direction "L" of the permanent magnet 11 of the rotor 10 is set to be disposed at a position displaced to the one side (output side "L1") with respect to a stator magnetic center virtual plane "A" which is a virtual plane formed in the radial direction perpendicular to the motor axial line direction "L" at a position of the magnetic center in the motor axial line direction "L" of the stator 20. In the second embodiment, different from the positional relationship shown in FIG. 6, the position of the permanent magnet magnetic center virtual plane "B" is located at the position on the output side with respect to the stator magnetic center virtual plane "A" when the coils 213 and 223 are not energized.

Modified Example of Second Embodiment

In the second embodiment described above, the output side radial bearing 5, which is held by the output side end plate 25, is utilized for structuring the support face 29 which supports the supported face 19 facing the output side "L1" of the rotor 10 in the fixed body 2. However, in a case that another frame is used which is provided with an opposing plate part facing the output side end plate 25 on the output side "L1" and a connecting plate part connecting the output side end plate 25 with the opposing plate part, the output side radial bearing 5 is held by the opposing plate part of the frame and an end part on the output side "L1" of the rotation shaft 12 is supported by the output side radial bearing 5. Also in this case, it may be structured that a supported face 19 facing the output side "L1" is provided in the rotation shaft 12 by utilizing a ring-shaped member or the like and the support face 29 is slidably supported by a face on the opposite-to-output side "L2" of the output side radial bearing 5.

First Modified Example of First Embodiment

Figure 4:
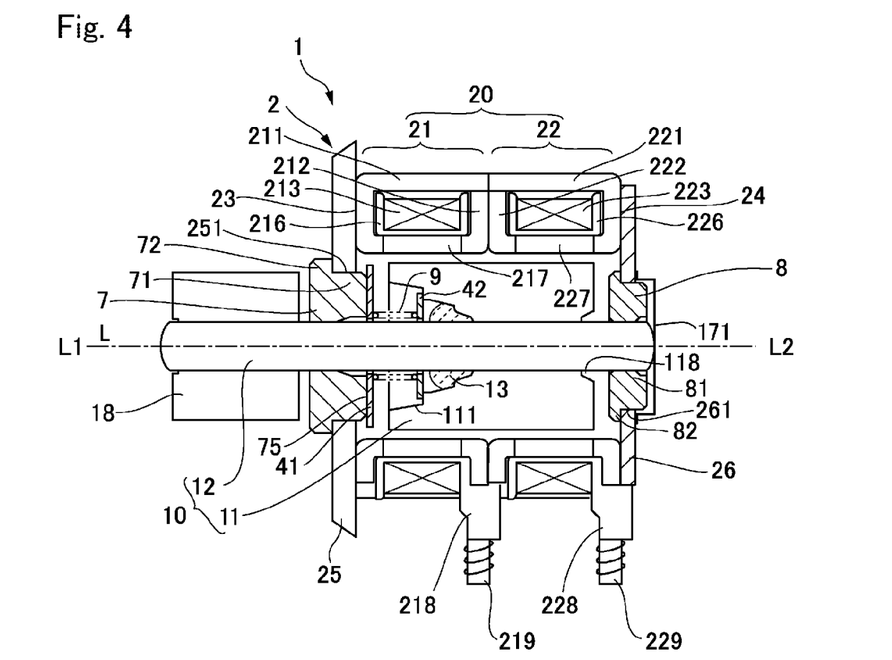
FIG. 4 is a cross-sectional view showing a stepping motor in accordance with a first modified example of the first embodiment of the present invention.

As shown in FIG. 4, in a first modified example of the first embodiment, a cap part 171 is provided which is abutted in a thrust direction with an end part of the rotation shaft 12 that is urged to the opposite-to-output side by the urging member 9. The cap part 171 is fixed to the opposite-to-output side end plate 26. In this case, a sliding load (second sliding load "Tb") is occurred by sliding of the end part of the rotation shaft 12 on the cap part 171. Therefore, a total sliding load (first sliding load "Ta") including the second sliding load "Tb" is set to be larger than the detent torque "Td" and set to be smaller than the dynamic torque "Te". Alternatively, a sliding load (second sliding load "Tb") of the end part of the rotation shaft 12 on the cap part 171 is set to be larger than the detent torque "Td". In FIG. 4, an end part of the rotation shaft 12 on the opposite-to-output side is formed in a curved convex face and is in point contact with the cap part 171. However, it may be structured that an end part of the rotation shaft 12 on the opposite-to-output side is formed in a flat face so as to be in surface contact with the cap part 171 for obtaining a sufficient sliding load (second sliding load "Tb"). Further, the cap part 171 is formed in a cup shape provided with a ring-shaped flange and a bottomed pipe shape and thus it may be structured that oil or the like is applied to a space surrounded by the opposite-to-output side radial bearing 8, the opposite-to-output side end plate 26 and the cap part 171 in order to adjust the sliding load.

Second Modified Example of First Embodiment

Figure 5:
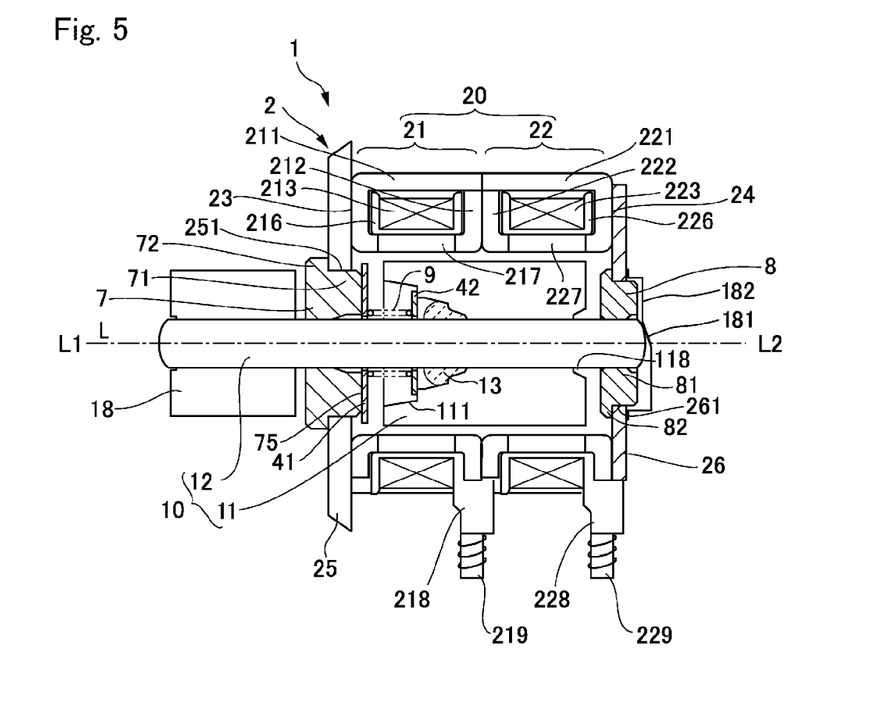
FIG. 5 is a cross-sectional view showing a stepping motor in accordance with a second modified example of the first embodiment of the present invention.

As shown in FIG. 5, in a second modified example of the first embodiment, a cap part 181 is provided with a plate spring part 182 which supports an end part on the opposite-to-output side of the rotation shaft 12 in an obliquely inclined state with respect to the motor axial line direction "L" and urges the rotation shaft 12. In FIG. 5, an end part of the rotation shaft 12 on the opposite-to-output side is formed in a curved convex face and is abutted with the plate spring part 182 of the cap part 181 to apply a sliding load. Further, in this embodiment, even when the rotation shaft 12 is rotated, the rotation shaft 12 is obliquely pressed by the plate spring part 182 and thus the rotation shaft 12 is prevented from vibrating in a radial direction.

Other Embodiments

In the embodiments described above, a coiled spring is used as the urging member 9 but a plate spring, a disc spring or the like may be used.

In the embodiments described above, the sliding load "Ta" is set in the motor axial line direction "L" (thrust direction). However, the sliding load "Ta" may be set by abutting with the rotation shaft 12 or by pressing against the rotation shaft 12 in a direction perpendicular to the motor axial line direction "L" (radial direction). Specifically, the rotation shaft 12 may be urged in a radial direction by a burr which is formed on an output side radial bearing or an opposite-to-output side radial bearing. Alternatively, an output side radial bearing and an opposite-to-output side radial bearing are displaced slightly in a radial direction when viewed in the motor axial line direction "L" to apply a sliding load to the rotation shaft 12.

In the embodiments described above, a gear 18 is fixed to the rotation shaft 12 but a lead screw may be formed on an outer peripheral face of the rotation shaft 12.

In the embodiments described above, the first sliding load "Ta" and the second sliding load "Tb" are set to satisfy the relationship with respect to the detent torque "Td" and the dynamic torque "Te" as shown by the following expression:

"Td"<"Tb"<"Ta"<"Te"

However, the first sliding load "Ta" and the second sliding load "Tb" may be set to satisfy the relationship as shown by the following expression:

"Tb"≤"Td"<"Ta"<"Te"

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A stepping motor comprising:
a rotor which comprises a rotation shaft and a permanent magnet on an outer peripheral face of the rotation shaft;
a fixed body which comprises a cylindrical stator provided with a plurality of pole teeth that are disposed in a circumferential direction so as to face an outer peripheral face of the permanent magnet;
an urging member which urges the rotor toward one side in a motor axial line direction;
a supported face of the rotor which faces the one side in the motor axial line direction; and
a support face of the fixed body which slidably supports the supported face of the rotor on the one side with respect to the supported face;
wherein when a first sliding load which is a total sliding load applied to the rotor is "Ta", a detent torque acted on the rotor is "Td", and a dynamic torque acted on the rotor by the stator is "Te", the first sliding load "Ta", the detent torque "Td" and the dynamic torque "Te" satisfy a relationship shown by the following expression:

"Td"<"Ta"<"Te".

2. The stepping motor according to claim 1, wherein when a second sliding load between the supported face and the support face in the first sliding load "Ta" is "Tb", the first sliding load "Ta", the second sliding load "Tb", the detent torque "Td" and the dynamic torque "Te" satisfy a relationship shown by the following expression:

"Td"<"Tb"<"Ta"<"Te".

3. The stepping motor according to claim 2, wherein
the rotor comprises a ring-shaped member which is held by the rotation shaft on the one side with respect to the permanent magnet, and
the supported face is a face on the one side of the ring-shaped member.

4. The stepping motor according to claim 3, wherein the ring-shaped member is press-fitted to the rotation shaft.

5. The stepping motor according to claim 3, wherein
the fixed body comprises a first radial bearing, which rotatably supports the rotation shaft on the one side with respect to the permanent magnet, and a second radial bearing which rotatably supports the rotation shaft on the other side in the motor axial line direction with respect to the permanent magnet,
the ring-shaped member is disposed between the permanent magnet and the first radial bearing, and
the ring-shaped member is abutted with the first radial bearing by an urging force of the urging member and thereby the second sliding load "Tb" due to abutting of the ring-shaped member with the first radial bearing is set to be larger than the detent torque "Td".

6. The stepping motor according to claim 5, further comprising a ring-shaped recessed part which is formed on an end face of the permanent magnet facing the second radial bearing so as to surround the rotation shaft,
wherein the urging member is a coiled spring which is disposed between the second radial bearing and the permanent magnet for urging the permanent magnet toward the one side, and
wherein an end part on the one side of the coiled spring is accommodated in an inside of the ring-shaped recessed part of the permanent magnet.

7. The stepping motor according to claim 5, wherein the first radial bearing is an oil-impregnated sintered bearing.

8. The stepping motor according to claim 5, wherein the ring-shaped member is a washer formed of resin material which is superior in abrasion resistance and lubricating ability.

9. The stepping motor according to claim 1, wherein
the fixed body comprises a first radial bearing, which rotatably supports the rotation shaft on the one side with respect to the permanent magnet, and a second radial bearing which rotatably supports the rotation shaft on the other side in the motor axial line direction with respect to the permanent magnet, and
the support face is a face of the first radial bearing which faces the other side.

10. The stepping motor according to claim 9, wherein an area of the supported face which slides on the support face facing the other side is equivalent to or less than an area of the support face.

11. The stepping motor according to claim 9, wherein the first radial bearing is provided with a tube part, which is fixed to the stator directly or through a separate member, and a flange part which is enlarged from the tube part on the other side and a face on the other side of the flange part is contacted with the supported face.

12. The stepping motor according to claim 9, wherein the urging member is a coiled spring.

13. The stepping motor according to claim 12, wherein the coiled spring is disposed between the permanent magnet and the second radial bearing.

14. The stepping motor according to claim 9, wherein the first radial bearing is an oil-impregnated sintered bearing.

15. The stepping motor according to claim 1, wherein
the fixed body comprises a first radial bearing, which rotatably supports the rotation shaft on the one side with respect to the permanent magnet, and a second radial bearing which rotatably supports the rotation shaft on the other side in the motor axial line direction with respect to the permanent magnet,
the rotor comprises a ring-shaped member which is held by the rotation shaft on the one side with respect to the permanent magnet,
the ring-shaped member is disposed between the permanent magnet and the first radial bearing, and
the ring-shaped member is abutted with the first radial bearing by an urging force of the urging member and thereby the first sliding load "Ta" due to abutting of the ring-shaped member with the first radial bearing is set to be larger than the detent torque "Td".

16. The stepping motor according to claim 15, further comprising a ring-shaped recessed part which is formed on an end face of the permanent magnet facing the second radial bearing so as to surround the rotation shaft,
wherein the permanent magnet and the rotation shaft are fixed to each other by an adhesive provided in an inside of the ring-shaped recessed part,
wherein the urging member is a coiled spring which is disposed between the second radial bearing and the permanent magnet for urging the permanent magnet toward the one side, and
wherein an end part on the one side of the coiled spring is accommodated in the inside of the ring-shaped recessed part of the permanent magnet.

17. The stepping motor according to claim 16, wherein the ring-shaped member is a washer formed of resin material which is superior in abrasion resistance and lubricating ability.

18. The stepping motor according to claim 1, wherein the support face is structured by a cap part on which an end face of the rotation shaft on the one side in the motor axial line direction is slid.

19. The stepping motor according to claim 18, wherein
the fixed body comprises a first radial bearing, which rotatably supports the rotation shaft on the one side with respect to the permanent magnet, and a second radial bearing which rotatably supports the rotation shaft on the other side in the motor axial line direction with respect to the permanent magnet,
the first radial bearing is attached to an end plate which is attached to an end face on the one side of the stator,
the cap part is attached to the end plate, and
the rotation shaft is abutted with the cap part by the urging force of the urging member and thereby the first sliding load "Ta" due to abutting of the rotation shaft with the cap part is set to be larger than the detent torque "Td".

20. The stepping motor according to claim 18, wherein the cap part is provided with a plate spring part which is urged to the end face of the rotation shaft.

21. The stepping motor according to claim 1, wherein
the stator has a coil, and
when the coil is not energized, a position of a permanent magnet magnetic center virtual plane, which is a virtual plane formed in a radial direction perpendicular to the motor axial line direction at a position of a magnetic center in the motor axial line direction of the permanent magnet of the rotor is disposed at a position displaced to the one side with respect to a stator magnetic center virtual plane which is a virtual plane formed in the radial direction perpendicular to the motor axial line direction at a position of a magnetic center in the motor axial line direction of the stator.

22. The stepping motor according to claim 21, wherein
the stator is structured so that a first cylindrical stator assembly which is disposed on the one side and a second cylindrical stator assembly which is disposed on the other side are adjacently disposed to each other in the motor axial line direction,
the first stator assembly is structured of a first coil which is wound around a first insulator and a pair of first stator cores which are disposed on both sides in the motor axial line direction of the first insulator,
the second stator assembly is structured of a second coil which is wound around a second insulator and a pair of second stator cores which are disposed on both sides in the motor axial line direction of the second insulator, and
the stator magnetic center virtual plane is located between the first coil and the second coil in the motor axial line direction.

\* \* \* \* \*